US011975385B2

(12) United States Patent
Darling et al.

(10) Patent No.: US 11,975,385 B2
(45) Date of Patent: May 7, 2024

(54) NANO-STRUCTURED ALLOY MATERIAL AND METHOD OF SYNTHESIZING

(71) Applicant: U.S. Army DEVCOM, Army Research Laboratory, Adelphi, MD (US)

(72) Inventors: Kristopher A. Darling, Havre de Grace, MD (US); Billy C. Hornbuckle, Bel Air, MD (US); Blake P. Fullenwider, Round Rock, TX (US); Albert M. Ostlind, Aberdeen, MD (US); Anthony J. Roberts, Chesapeake City, MD (US); Anit K. Giri, Abingdon, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 17/700,653

(22) Filed: Mar. 22, 2022

(65) Prior Publication Data

US 2023/0302531 A1    Sep. 28, 2023

(51) Int. Cl.
| | |
|---|---|
| *B22F 1/054* | (2022.01) |
| *B22F 1/065* | (2022.01) |
| *B82Y 30/00* | (2011.01) |
| *B82Y 40/00* | (2011.01) |
| *C22C 9/00* | (2006.01) |

(52) U.S. Cl.
CPC ............ *B22F 1/054* (2022.01); *B22F 1/065* (2022.01); *B82Y 30/00* (2013.01); *C22C 9/00* (2013.01); *B22F 2301/10* (2013.01); *B82Y 40/00* (2013.01)

(58) Field of Classification Search
CPC ................................ B82Y 30/00; B82Y 40/00
See application file for complete search history.

(56) References Cited

U.S. PATENT DOCUMENTS

| | | | |
|---|---|---|---|
| 9,333,558 B2 | 5/2016 | Darling et al. | |
| 9,822,430 B2 | 11/2017 | Kecskes et al. | |
| 10,487,375 B2 | 11/2019 | Kecskes et al. | |
| 10,766,071 B2 | 9/2020 | Kecskes et al. | |
| 10,851,440 B2 | 12/2020 | Darling et al. | |
| 2016/0130689 A1* | 5/2016 | Choi .................. | C21D 6/00 148/579 |

(Continued)

FOREIGN PATENT DOCUMENTS

| | | |
|---|---|---|
| CN | 113755726 A * | 12/2021 |
| WO | WO 2021/236476 | 11/2021 |

OTHER PUBLICATIONS

Moustafa, E. B., et al. "The Effectiveness of Incorporating Hybrid Reinforcement Nanoparticles in the Enhancement of the Tribological Behavior of Aluminum Metal Matrix Composites," Nov. 12, 2021, The Minerals, Metals & Materials Society, vol. 73 , No. 12, pp. 4338-4348. (Year: 2021).*

(Continued)

*Primary Examiner* — Anthony M Liang
*Assistant Examiner* — Ricardo D Morales
(74) *Attorney, Agent, or Firm* — Emily C. Moscati

(57) ABSTRACT

A nano-structured alloy material includes a nanoparticle; a matrix phase surrounding the nanoparticle; and an alkali/alkali Earth metal to alter (i) a material property of the nanoparticle, (ii) a material property of the matrix phase, and (iii) an interaction of the nanoparticle with the matrix phase.

14 Claims, 5 Drawing Sheets

(56) References Cited

U.S. PATENT DOCUMENTS

2016/0175931 A1 6/2016 Baker et al.
2018/0133790 A1* 5/2018 Yahata .................... C22C 21/02

OTHER PUBLICATIONS

Zoz, H., et al., "Mechanical Alloying—Principle, Development & Current Activities—(Part I-VII)," Thermec2000, International Conference on Processing & Manufacturing of Advanced Materials, Dec. 4-8, 2000, Las Vegas, NV, pp. 1-41.

* cited by examiner

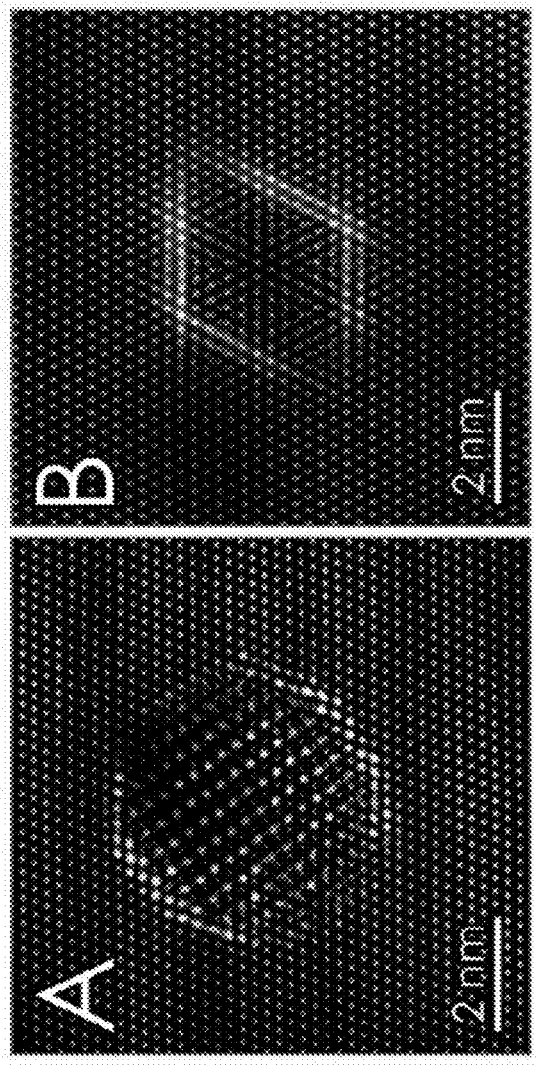
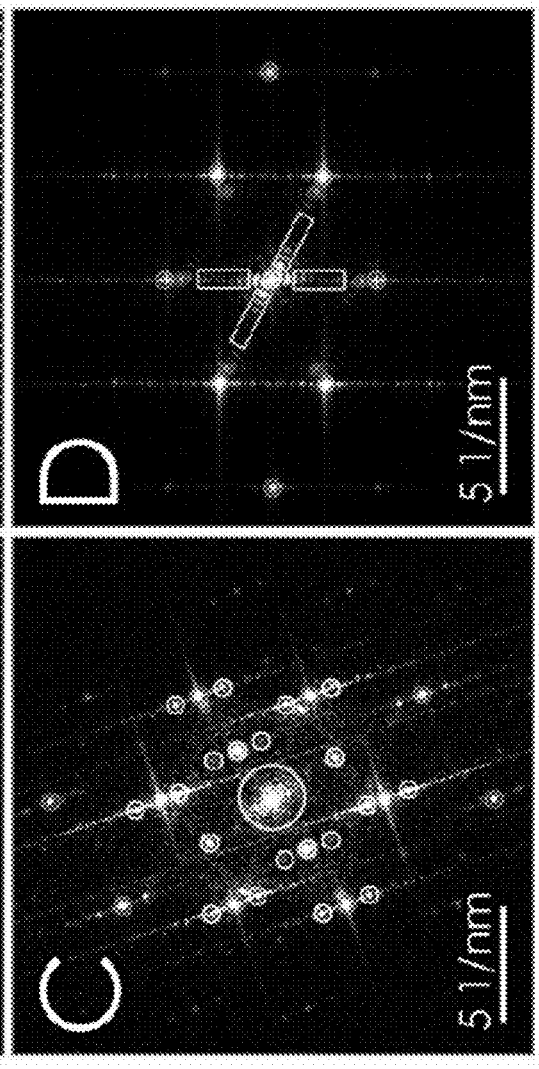

NANO-STRUCTURED ALLOY MATERIAL AND METHOD OF SYNTHESIZING

GOVERNMENT INTEREST

The embodiments herein may be manufactured, used, and/or licensed by or for the United States Government without the payment of royalties thereon.

BACKGROUND

Technical Field

The embodiments herein generally relate to nanotechnology, and more particularly to nano-structured alloy materials.

Description of the Related Art

The ever-increasing demand for higher energy efficiency continuously pushes the boundary of high-performance alloys to be stronger, tougher, and more resistant to extreme environments. In the last few decades, nanotechnology has played important roles in the development of advanced alloys, particularly in reducing grain sizes down to the nanometer scale and the re-introduction of oxygen through oxide dispersions via mechanical alloying (MA) and milling. In addition to the reduction of grain size, a key feature of mechanical alloying and milling is its capability to synthesize non-equilibrium alloy phases, including supersaturated solid solutions, metastable intermetallics, and quasicrystalline phases, which may not be accessible via conventional processing routes.

SUMMARY

In view of the foregoing, an embodiment herein provides a nano-structured alloy material comprising a nanoparticle; a matrix phase surrounding the nanoparticle; and an alkali/alkali Earth metal to alter (i) a material property of the nanoparticle, (ii) a material property of the matrix phase, and (iii) an interaction of the nanoparticle with the matrix phase. The material property of the nanoparticle may comprise any of a core, shape, morphology, size (>1 nm and <100 nm), structure, and coherency of the nanoparticle with respect to the matrix phase. The material property of the matrix phase may comprise any of the stacking fault energy, texture, crystal orientation, twin spacing (twin width), and symmetry. The interaction may comprise a change in a coherency (e.g., how well do atoms line up) of the nanoparticle with the matrix phase.

The alkali/alkali Earth metal may comprise a concentration of less than 5 at %. The alkali/alkali Earth metal may comprise any of groups I and II elements or a hydride of the groups I and II elements. The alkali/alkali Earth metal may change a material structure of the nanoparticle from spherical to cubic. The nanoparticle may comprise any of a Cu—Ta based alloy material and Cu in combination with any of a Group III, IV, V, or VI element or Cu in combination with any of Fe and Co. The matrix phase may primarily comprise a binary composition in the form of a solid solution. The matrix phase may comprise any of a Cu base metal and 25% at to 0% at (of the composition of the matrix phase) of a portion of any of a Group III, IV, V, or VI element or Cu in combination with any of Fe and Co. The matrix phase may also comprise any of the alkali/alkali Earth metal of groups I and II elements or a hydride of the groups I and II elements. The matrix phase may comprise a grain size of an average diameter greater than 1 nm and less than 10 microns and, within those grains, an altered material property of the nanoparticle by the Earth metal may create a nano-structured superlattice (NSS) clusters/alloy material comprising an order $L_{12}$ $Cu_3Li$ phase. The nanoparticle may comprise a core structure, wherein Group I and Group II elements may occupy the core structure of the nanoparticle, and wherein a Group III, IV, V, or VI element or Fe and Co may exist in mono, bi, or greater atomic layers between the core structure and the matrix phase. The NSS clusters/alloy material may comprise particles with diameters of less than 10 nm. The NSS clusters/alloy material may comprise a particle number density greater than $10^{15}/m^3$.

The nano-structured alloy material may comprise a high number density of nanoparticles. The nanoparticle may be formed by self-assembly via the decomposition of a Cu—Ta based alloy/material. A dispersion of the nanoparticles within the matrix phase may impart a retained material strength to the nano-structured alloy material of approximately 1 GPa after having been exposed for at least 100 hours and at temperature greater than 90% of an absolute melting temperature of the nano-structured alloy material.

Another embodiment provides a method of synthesizing a nano-structured alloy material, the method comprising providing a nanoparticle; providing a matrix phase surrounding the nanoparticle; and adding a solute of an alkali/alkali Earth metal to alter (i) a material property of the nanoparticle, (ii) a material property of the matrix phase, and (iii) an interaction of the nanoparticle with the matrix phase. The material property of the nanoparticle may comprise any of a core, shape, morphology, size (>1 nm and <100 nm), structure, and coherency of the nanoparticle with respect to the matrix phase. The material property of the matrix phase may comprise any of the stacking fault energy, texture, crystal orientation, twin spacing (twin width), and symmetry. The interaction may comprise a change in a coherency (e.g., how well do atoms line up) of the nanoparticle with the matrix phase.

The alkali/alkali Earth metal may comprise a concentration of less than 5 at %. The alkali/alkali Earth metal may comprise any of groups I and II elements or a hydride of the groups I and II elements. The alkali/alkali Earth metal may change a material structure of the nanoparticle from spherical to cubic. The nanoparticle may comprise any of a Cu—Ta based alloy material and Cu in combination with any of a Group III, IV, V, or VI element or Cu in combination with any of Fe and Co. The matrix phase may primarily comprise a binary composition in the form of a solid solution. The matrix phase may comprise any of a Cu base metal and 25% at to 0% at (of the composition of the matrix phase) of a portion of any of a Group III, IV, V, or VI element or Cu in combination with any of Fe and Co. The matrix phase may also comprise any of the alkali/alkali Earth metal of groups I and II elements or a hydride of the groups I and II elements. The matrix phase may comprise a grain size of an average diameter greater than 1 nm and less than 10 microns and within those grains an altered material property of the nanoparticle by the Earth metal may create a nano-structured superlattice (NSS) clusters/alloy material comprising an order $L_{12}$ $Cu_3Li$ phase. The nanoparticle may comprise a core structure, wherein Group I and Group II elements may occupy the core structure of the nanoparticle, and wherein a Group III, IV, V, or VI element or Fe and Co may exist in mono, bi, or greater atomic layers between the core structure and the matrix phase. The NSS clusters/alloy material may comprise particles with diameters of less than 10 nm. The NSS clusters/alloy material may comprise a particle number density greater than $10^{15}/m^3$.

The nano-structured alloy material may comprise a high number density of nanoparticles. The nanoparticle may be formed by self-assembly via the decomposition of a Cu—Ta based alloy/material. A dispersion of the nanoparticles within the matrix phase may impart a retained material strength to the nano-structured alloy material of approximately 1 GPa after having been exposed for at least 100 hours and at temperature greater than 90% of an absolute melting temperature of the nano-structured alloy material.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 5A is a magnified microscopic image of binary CuTa showing the atomic structure of a spherical Ta based cluster, according to an embodiment herein;

FIG. 5B is a magnified microscopic image of binary CuTa showing the atomic structure of a CuTaLi cuboidal cluster, according to an embodiment herein;

FIG. 5C is a diffraction information image of FIG. 5A, according to an embodiment herein;

FIG. 5D is a diffraction information image of FIG. 5B, according to an embodiment herein;

DETAILED DESCRIPTION

Figure 2:
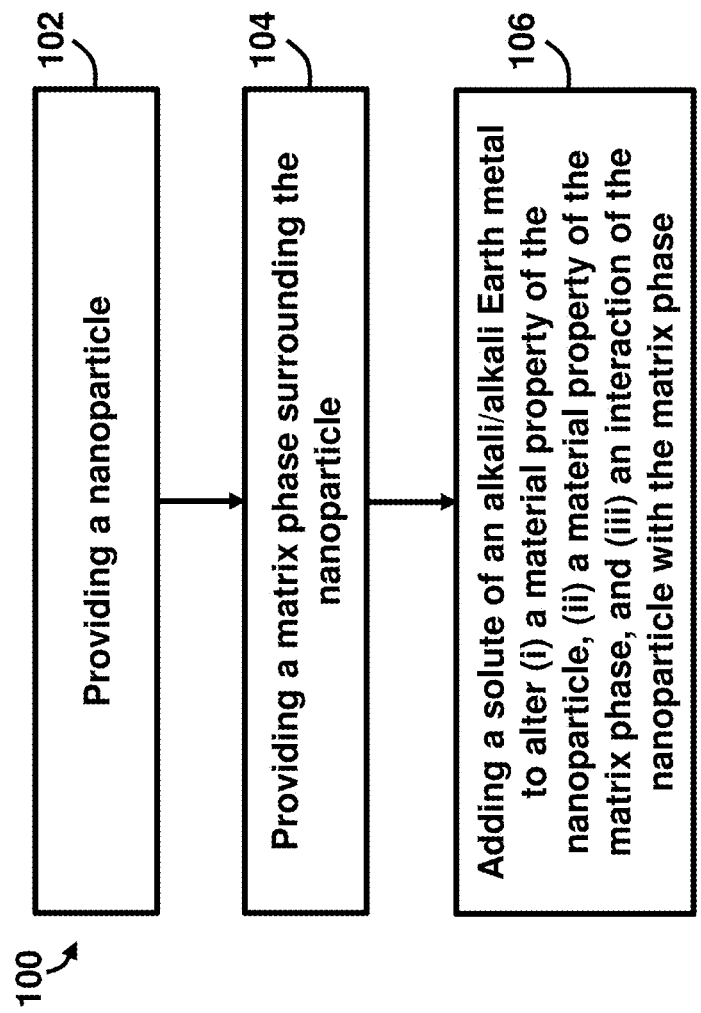
FIG. 2 is a flow diagram illustrating method of synthesizing a nano-structured alloy material, according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as not to unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Currently, all alloys utilizing conventional coherent oxide nano particles do not incorporate alkali/alkali Earth metals in their structure. The embodiments herein provide a new nano-sized alloy structure that significantly modifies an existing structure making the Cu—Ta alloy more thermally stable and mechanically resistant. The embodiments herein may be utilized in the construction of engine gears/components, turbine blades, hypersonics, radiation shielding, and high temperature components, among other applications. Referring now to the drawings, and more particularly to FIGS. 1 through 6D, where similar reference characters denote corresponding features consistently throughout the figures, there are shown preferred embodiments. In the drawings, the size and relative sizes of components, layers, and regions, etc. may be exaggerated for clarity.

Figure 1:
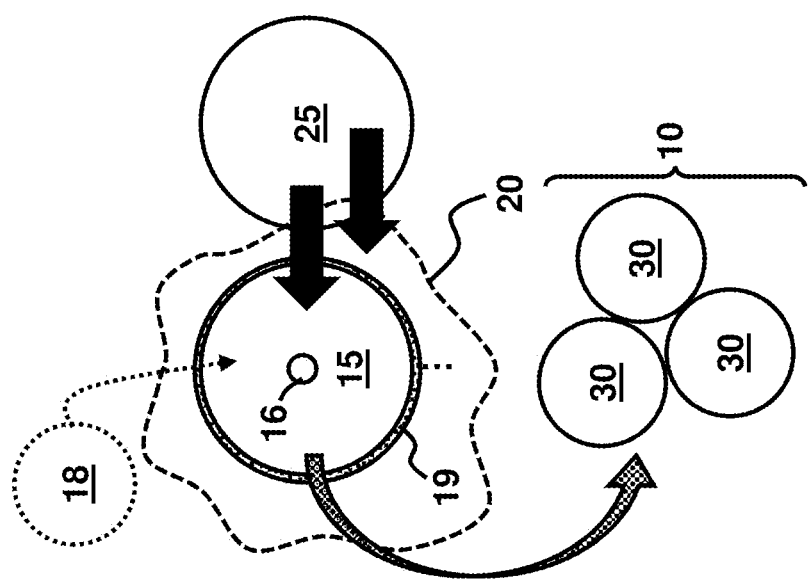
FIG. 1 is a schematic diagram illustrating a nano-structured alloy material, according to an embodiment herein.
Figure 3A:
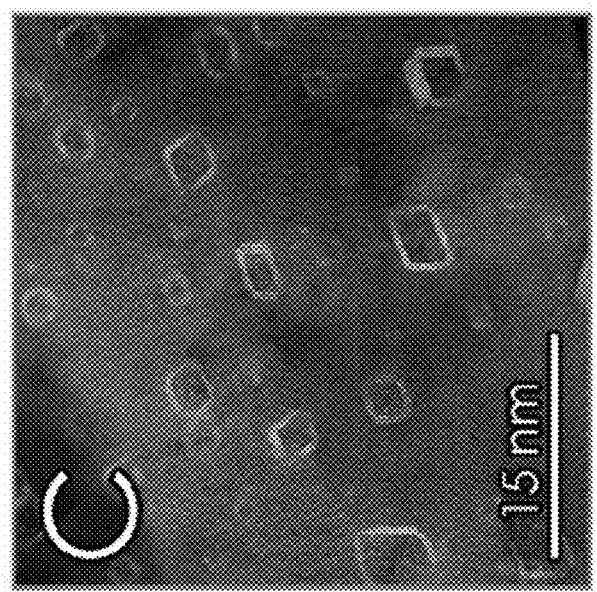
FIG. 3A is a magnified microscopic image of binary CuTa showing spherical Ta based clusters, according to an embodiment herein.
Figure 3B:
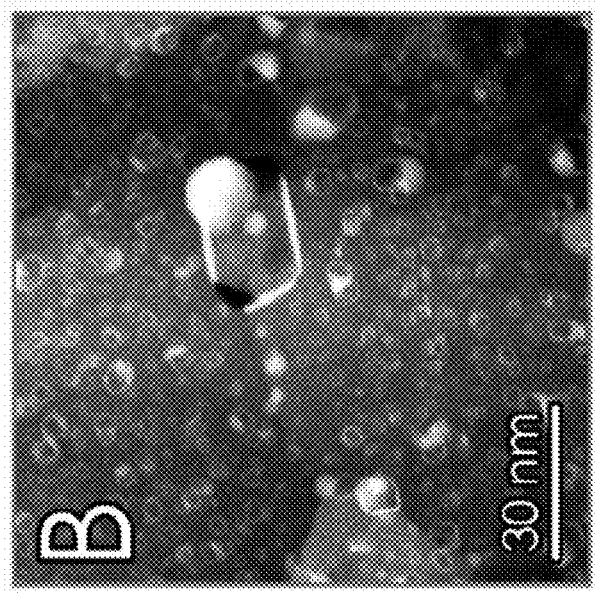
FIG. 3B is a magnified microscopic image of a CuTaLi alloy having cuboidal TaLi based, according to an embodiment herein.
Figure 3C:
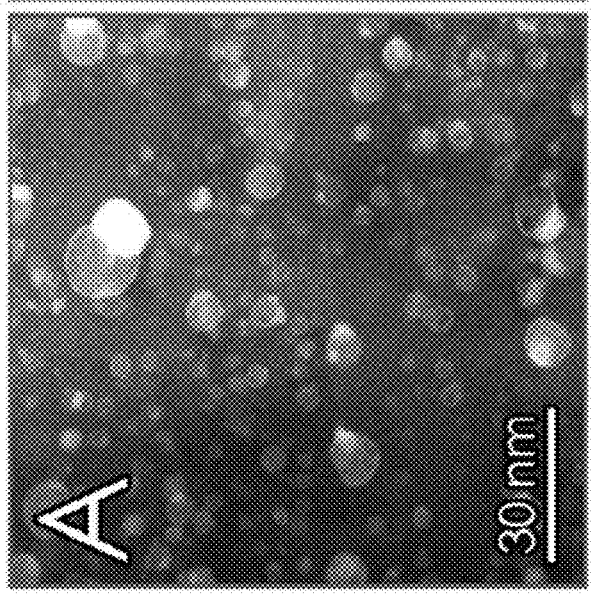
FIG. 3C is a further magnified microscopic image of a CuTaLi alloy having cuboidal TaLi based, according to an embodiment herein.

FIG. 1 illustrates a nano-structured alloy material 10 comprising a nanoparticle 15; a matrix phase 20 surrounding the nanoparticle 15; and an alkali/alkali Earth metal 25 to alter (i) a material property of the nanoparticle 15, (ii) a material property of the matrix phase 20, and (iii) an interaction of the nanoparticle 15 with the matrix phase 20. The material property of the nanoparticle 15 may comprise any of a core, shape, morphology, size (>1 nm and <100 nm), structure, and coherency 19 of the nanoparticle 15 with respect to the matrix phase 20. The material property of the matrix phase 20 may comprise any of the stacking fault energy, texture, crystal orientation, twin spacing (e.g., twin width), and symmetry. The interaction may comprise a change in a coherency 19 (e.g., how well do atoms line up) of the nanoparticle 15 with the matrix phase 20, wherein increased coherency is preferred. In an example, the melting point of the matrix phase 20 is approximately 1084.5° C.

The alkali/alkali Earth metal 25 may comprise a concentration of less than 5 at %. The alkali/alkali Earth metal 25 may comprise any of groups I and II elements or a hydride of the groups I and II elements. The alkali/alkali Earth metal 25 may change a material structure of the nanoparticle 15 from spherical to cubic. The nanoparticle 15 may comprise any of a Cu—Ta based alloy material and Cu in combination with any of a Group III, IV, V, or VI element or Cu in combination with any of Fe and Co. The matrix phase 20 may primarily comprise a binary composition in the form of a solid solution. The matrix phase 20 may comprise any of a Cu base metal and 25% at to 0% at (of the composition of the matrix phase 20) of a portion of any of a Group III, IV, V, or VI element or Cu in combination with any of Fe and Co. The matrix phase may also comprise any of the alkali/alkali Earth metal of groups I and II elements or a hydride of the groups I and II elements. The matrix phase 20 may comprise a grain size of an average diameter greater than 1 nm and less than 10 microns. Within a grain of the matrix phase 20, an altered material property of the nanoparticle 15 by the alkali/alkali Earth metal 25 may create nano-structured superlattice (NSS) clusters/alloy material 30 comprising an order $L_{12}$ $Cu_3Li$ phase. The nanoparticle 15 may comprise a core structure 16, wherein Group I and Group II elements may occupy the core structure 16 of the nanoparticle 15, and wherein a Group III, IV, V, or VI element or Fe and Co may exist in mono, bi, or greater atomic layers between the core structure 16 and the matrix phase 20. The NSS clusters/alloy material 30 may comprise particles with diameters of less than 10 nm. The NSS clusters/alloy material 30 may comprise a particle number density greater than $10^{15}/m^3$. The NSS 30 may comprise any suitable size, shape, and configuration in accordance with the embodiments herein. Preferably, the NSS 30 has a shape that is cubic or cuboidal, and preferably has a size that is less than 4 nm, has a preferable number density of greater $10^{20}$, and exhibits a preferable fully coherent relationship with the matrix phase 20, according to various examples.

The nano-structured alloy material 10 may comprise a high number density of nanoparticles 15. For example, the range of the density of nanoparticles 15 may be between $10^{15}/m^3$ to $10^{30}/m^3$ with a preferable density of nanoparticles 15 in the range of $10^{20}/m^3$ to $10^{25}/m^3$. The nanoparticle 15 may be formed by self-assembly via the decomposition of a Cu—Ta based alloy/material 18. According to an example, a dispersion of the nanoparticles within the matrix phase 20 may impart a retained material strength to the nano-structured alloy material 10 of approximately 1 GPa after having been exposed for at least 100 hours and at a temperature greater than 90% of an absolute melting temperature of the nano-structured alloy material 10.

The formation of a new ordered structure; i.e., nanocrystalline Cu—Ta alloy material, is assisted by oxygen and further enhanced by lithium through ball milling, creating the NSS cluster alloy material 30 (also referred to herein as "NSS clusters"). The NSS clusters 30 may be synthesized by adding the alkali/alkali Earth metal 25 in low concentrations; i.e., <5 at % to a base metal or alloy during its initial synthesis. In an example, Li-hydride may be added during the high energy ball milling process of elemental Cu and Ta powders. The resulting effect is to transform the prior coherent spherical Ta based cluster with an oxygen core to a cuboidal NSS cluster 30 wherein Li solute occupies the core structure 16 and where Ta exists in mono, bi, or greater atomic layers between the core structure 16 and the surrounding matrix phase 20. Further, the crystal structure of the NSS core is that of an order $L_{12}$ $Cu_3Li$ phase. The presence of the Ta atom layers between the core Liz $Cu_3Li$ phase and the surrounding matrix phase 20 reduces the interfacial energy and at the same time increases the work of separation for the interface (e.g., through adhesion) via a favorable valence charge transfer between the matrix phase 20 and Ta layers as well as the inner core $L_{12}$ $Cu_3Li$ phase and the layers of Ta atoms. This charge transfer is necessary in order to stabilize the entire structure as well as the lattice of the $L_{12}$ $Cu_3Li$ core making it more favorable to exist.

In addition to stabilizing, crystal structure/morphologic changes to the Ta based clusters, Li provides several other key attributes to the CuTa system. First, Li is immiscible with Ta yet soluble in Cu. This is important because when Li is provided in excess and is dissolved in solution (i.e., to form a solid solution between Li and the Cu in the Cu matrix 20 or matrix grains, through ball milling) it will lower the stacking fault energy thereby greatly increasing the tendency of the matrix 20 or matrix grains to form partial dislocations, stacking faults and twin boundaries. All of these structures provide increase performance including but not limited to (1) increased yield strength/hardness, (2) increased strain hardening, (3) increased grain growth stability, (4) increased ductility, and (5) increased creep resistance. In turn, this new dispersion of NSS clusters 30 significantly increases the thermal and thermomechanical stability of the microstructure and physical properties of the nanocrystalline Cu—Ta alloy. In addition to the physical and structural enhancements to the CuTa system, Li also provides advantages in the processing side (if provided in hydride form [LiH]), including but not limited to (1) LiH is more stable that pure Li metal especially with water and nitrogen, and (2) upon decomposition of LiH, the free H will potentially reduce any unstable oxides present in the system. Finally, LiH acts as a processing aid that facilitates scale-up and commercialization of the powder by preventing cold welding without the detrimental effect of carbon-based processing aids getting incorporated as contaminates. Thus, the aforementioned, LiH is selected as the primary candidate for addition and stabilization of the Ta clusters in CuTa and overall processing of the CuTa alloy to from the CuTaLi alloy and all of its advantages both physical, structural, and in processing.

The most important and efficient strengthening mechanism in alloys is to create and maintain, under service conditions, coherent interfaces between the matrix and precipitates. Successful examples of engineering alloys following this principle include age-hardenable Al alloys for automotive engines, Ni-base superalloys predominantly used in gas turbines and oxide dispersed strengthened (ODS) alloys for nuclear reactors. The nano-structured alloy material 10 is a new ordered structure in nanocrystalline Cu—Ta alloys, assisted by oxygen and further enhanced by lithium through ball milling, NSS clusters. The Li addition being a surfactant removes the necessity of utilizing cryogenics as a processing agent (i.e., cryogenic ball-milling). This aspect removes the hurdles associated with ease of large-scale manufacturing as well as cost of production. These NSS clusters 30 are coherent with the Cu matrix 20 and contribute to the retention of high hardness of Cu after long term extreme high temperature exposure. The NSS clusters 30 provide a strengthening mechanism for the development of even more advanced high-performance Cu, Fe or other based alloys which rely at least in part on oxide particle/clusters dispersions for high temperature applications including nuclear reactors and or turbine engines.

The alkali/alkali Earth metals 25 including Li, Na, K, Ca, etc. have an extreme affinity for oxygen and typically fall at the bottom of an Ellingham diagram and hence are very effective reducers of other metal oxides. These properties can be utilized to alter the particles/clusters in other oxide dispersed strengthen metal or alloys systems. When added to a base metal or alloy, such as one which contains nanoparticles 15, the chemical potential of the alkali/alkali Earth metals 25 creates a thermodynamic driving force to seek out oxygen. In materials which utilized nanoscale oxide particle such as, for example, nanocrystalline composites and/or ODS alloys there will be a driving force to seek out and reduce these nanoscale oxide particles. In some cases, these oxide particles are <10 nm in diameter and have a core structure where the oxygen is concentrated. The reduction of these former particles results in the creation of the new NSS cluster material 30 which will incorporate the elements of the former oxide nanoparticle 15 and surrounding matrix phase 20. In the case when oxygen is concentrated in the core, the alkali/alkali Earth metals 25 will tend to penetrate that core and also become concentrated. One example application is for nanocrystalline Cu—Ta alloys. That is, the microstructural linage of the Cu—Ta system can be passed down to other systems which contain nanoscale oxide/ clusters. In the case of Cu—Ta these new NSS clusters 30 are more stable with respect to temperature and mechanical deformation than the conventional Ta based spherical NSS clusters. Accordingly, these attributes significantly increase the high temperature application space for the alloy material 10.

The embodiments herein utilize the alkali/alkali Earth metals 25 in the core structure 16 to alter the core, shape, morphology, size, structure, and/or coherency of the nanoparticle 15 and its relationship with the surrounding matrix phase 20 or matrix grains in CuTa alloys. Arbitrarily, alkali/alkali Earth metals 25 can be used to in any alloy that utilizes nanoscale oxide particles to attain their properties. When referencing the aforementioned Ellingham diagram, there are very few elements with a higher driving force to form an oxide than Li. This fact has interesting repercussions: Li can used to reduce most oxides in addition to Li having an extremely small atomic radius. Accordingly, Li atoms will likely seek out, rapidly diffuse, and be drawn into the oxygen enriched core regions of many other nanoscale oxides and or clusters present. Thus, the addition of Li, (an element rarely added to alloys) provides a new mechanism for the development of even more advanced high performance Cu, Fe, or other alloys which rely at least in part on oxide particle/clusters dispersions for high temperature applications. As indicated above, this includes ODS or similar alloys used in nuclear reactors, turbine engines, or any other extreme environments.

FIG. 2, with reference to FIG. 1, is a flow diagram illustrating a method 100 of synthesizing a nano-structured alloy material 10. The method 100 comprises providing (102) a nanoparticle 15; providing (104) a matrix phase 20 surrounding the nanoparticle 15; and adding (106) a solute of an alkali/alkali Earth metal 25 to alter (i) a material property of the nanoparticle 15, (ii) a material property of the matrix phase 20, and (iii) an interaction of the nanoparticle 15 with the matrix phase 20. The material property of the nanoparticle 15 may comprise any of a core 16, shape, morphology, size (e.g., >1 nm and <100 nm), structure, and coherency 19 of the nanoparticle 15 with respect to the matrix phase 20. The material property of the matrix phase 20 may comprise any of the stacking fault energy, texture, crystal orientation, twin spacing (twin width), and symmetry. The interaction may comprise a change in a coherency 19 (e.g., how well do atoms line up) of the nanoparticle 15 with the matrix phase 20.

The alkali/alkali Earth metal 25 may comprise a concentration of less than 5 at %. The alkali/alkali Earth metal 25 may comprise any of groups I and II elements or a hydride of the groups I and II elements. The alkali/alkali Earth metal 25 may change a material structure of the nanoparticle 15 from spherical to cubic. The nanoparticle 15 may comprise any of a Cu—Ta based alloy material and Cu in combination with any of a Group III, IV, V, or VI element or Cu in combination with any of Fe and Co. The matrix phase 20 may primarily comprise a binary composition in the form of a solid solution. The matrix phase 20 may comprise any of a Cu base metal and 25% at to 0% at (of the composition of the matrix phase) of a portion of any of a Group III, IV, V, or VI element or Cu in combination with any of Fe and Co. The matrix phase 20 may also comprise any of the alkali/alkali Earth metal 25 of groups I and II elements or a hydride of the groups I and II elements. The matrix phase 20 may comprise a grain size of an average diameter greater than 1 nm and less than 10 microns and, within those grains, an altered material property of the nanoparticle 15 by the alkali/alkali Earth metal 25 may create a nano-structured superlattice (NSS) clusters/alloy material 30 comprising an order $L_{12}$ $Cu_3Li$ phase. The nanoparticle 15 may comprise a core structure 16, wherein Group I and Group II elements may occupy the core structure 16 of the nanoparticle 15, and wherein a Group III, IV, V, or VI element or Fe and Co may exist in mono, bi, or greater atomic layers between the core structure 16 and the matrix phase 20. The NSS clusters/alloy material 30 may comprise particles with diameters of less than 10 nm. The NSS clusters/alloy material 30 may comprise a particle number density greater than $10^{15}/m^3$.

The nano-structured alloy material 10 may comprise a high number density of nanoparticles 15. For example, the range of the density of nanoparticles 15 may be between $10^{15}/m^3$ to $10^{30}/m^3$ with a preferable density of nanoparticles 15 in the range of $10^{20}/m^3$ to $10^{25}/m^3$. The nanoparticle 15 may be formed by self-assembly via the decomposition of a Cu—Ta based alloy/material 18. A dispersion of the nanoparticles 15 within the matrix phase may impart a retained material strength to the nano-structured alloy material 10 of approximately 1 GPa after having been exposed for at least 100 hours and at temperature greater than 90% of an absolute melting temperature of the nano-structured alloy material 10.

The material property of the nanoparticle 15 may comprise any of a core, shape, morphology, size, structure, and coherency of the nanoparticle 15 with respect to the matrix phase 20. The material property of the matrix phase 20 may comprise any of the stacking fault energy, texture, crystal orientation, twin spacing, and symmetry. The interaction may comprise a change in a coherency of the nanoparticle 15 with the matrix phase 20, wherein increased coherency is preferred. The alkali/alkali Earth metal 25 may change a material structure of the nanoparticle 15 from spherical to cubic. An altered material property of the nanoparticle 15 by the Earth metal 25 may create a NSS clusters/alloy material 30 comprising an order $Li_2$ $Cu_3Li$ phase.

The NSS clusters/alloy material 30 may be synthesized by adding an alkali/alkali Earth metal 25 in low concentrations, i.e., <5 at % to the base metal or alloy (e.g., nanoparticle 15) during its initial synthesis. In this particular case, Li-hydride may be added during the high energy ball milling process of elemental Cu and Ta powders. The resulting effect transforms the coherent spherical Ta based NSS with an oxygen core to a cuboidal NSS 30, wherein Li solute occupied the core structure and where Ta exists in mono, bi, or greater atomic layers between the core structure and the surrounding Cu matrix 20. These cuboidal NSS clusters 30 occupy intergranular regions within the matrix 20 as well. The overall the effect of transforming from spherical to cuboidal increases the level of coherency with the matrix phase 20 as well as the stability of the NSS cluster 30 as a whole. In turn, this new dispersion of NSS clusters 30 significantly increases the thermal and thermomechanical stability of the microstructure and physical properties of the nanocrystalline Cu—Ta alloy. Furthermore, the design methodology utilizing alkali/alkali Earth metals 25 in the core structure 16 to alter the core, shape, morphology and/or coherency of the nanoparticle 15 and its relationship with the surrounding matrix phase 20 can be used to in any alloy that utilizes nanoscale oxide particles to attain their properties.

Some processes for forming the binary or higher order high-density thermodynamically stable nanostructured Cu—Ta alloy material 10 may include, for example, subjecting powder metals of the solvent to a high-energy milling process using a high-energy milling device configured to impart high impact energies to its contents. The material 10 is thermally stabilized, with the absence of substantial gross grain growth, such that the internal grain size of the solvent metal is substantially suppressed to no more than about 500 nm at approximately 95% of the melting point temperature of the solvent metal remains substantially uniformly dispersed in the solvent metal at that temperature. For instance, a high-energy milling device may be used to subject the metallic powders to the high-energy milling process. Such a device may include, for example, a mixing vial for containing the metallic powders and a plurality of milling balls for inclusion within the mixing vial for milling the metallic powders therein.

Within milling there are two categories, high energy and low energy. High-energy milling is a term of art, which denotes powdered milling processes that facilitate alloying on an atomic level. U.S. Pat. Nos. 9,333,558 and 9,822,430 disclose some exemplary material systems and fabrication methodologies which, in accordance with embodiments of the embodiments herein, may be extended and/or adapted for providing nanostructures with extreme creep resistance. These patents are herein incorporated by reference in their entireties and primarily describe high-energy milling. As such, they utilize significantly higher impact energies than other powdered milling processes, such as planetary milling or attritor milling, wherein, due to the physical design of the apparatus, the energy imparted to the powder is less. Examples of high-energy milling includes high energy ball milling apparatuses such as the SPEX Industries, Edison, N.J. series of mills and Zoz GmbH, Germany, series of mills. Relatively lower energy types include the Pulverisette planetary ball mills from Fritsch GmbH, Idar-Oberstein, Germany; the PM series of planetary ball mills from Retsch GmbH, Dusseldorf, Germany; or the attritor type mills from Union Process, Akron, Ohio. For a more detailed comparison of milling devices, see, e.g., Table 1-2 on page 3 of Zoz, H., et al., "Mechanical Alloying—Principle, Development & Current Activities—(Part I-VII)," Thermec2000, International Conference on Processing & Manufacturing of Advanced Materials, Dec. 4-8, 2000, Las Vegas, NV, pp. 1-41, herein incorporated by reference in its entirety.

However, many of the lower energy mills (Planetary, Attritor and Drum) might be configured to produce materials as described herein. That is, the kinetic energy of the mills or the energy dosage; i.e., energy input into the starting metal powders can be increased by extending the milling time and or increasing the ball-to-powder ratio. Where the ball-to-powder ratio is defined by the mass of the milling ball bearings to that of the powder mass. In high energy milling processes the ball-to-powder ratio is between 1-10. However, in lower energy mills, the ball-to-powder ratio can be increased to values between 10-100. The same order of magnitude increase can be true of the milling time as well. Increasing both the ratio and the milling time can ultimately result in a lower energy mill being able to produce a similar powder product as in the high energy mills. It is noted, however, that due to inherent limitations on the devices themselves and their operation (such as the kinetic energy generated), not all low energy milling devices may be usable or otherwise practical for practicing the embodiments herein.

Depending on the extent of milling operations, the range of intermixing varies from very large clusters (on the order of micro- to millimeters, containing a very large number atoms), to precipitates (nano- to micrometers, containing thousands of atoms), to particles (nanometers, containing tens of atoms), to single atoms. High energy may be imparted to the metallic system by applying high levels of kinetic or dynamic energy during the milling process where vials containing the precursor solvent and solute metals are shaken back and forth thousands of times a minute using impact milling media resulting in more than twice as many impacts a minute.

In general, mechanical milling/alloying produces nanostructured materials with grain sizes well below 100 nm by repeated mechanical attrition of coarser grained powdered materials. Precursor powders are loaded into a steel vial and hardened steel or ceramic balls are also added. The vial then is sealed and shaken for extended periods of time. For example, the vials may be shaken 1060 times a minute resulting in some 2120 impacts a minute. This high-energy ball milling results in an almost complete breakdown of the initial structure of the particles. The result particles can have average particle size or agglomerate size as low as 1-10 mm.

More specifically, on an atomic level, atoms can be forced into a metastable random solid solution or potentially occupy defect sites such as dislocations, triple junctions, and grain boundaries. This process is critical for setting up thermodynamic stabilization. The breakdown occurs due to the collisions of the particles with the walls of the vial and the balls. The energy deposited by the impact of the milling balls is sufficient to displace the atoms from their crystallographic positions. On a microscopic level, the particles fracture, aggregate, weld, and re-fracture causing the evolution of a heavily worked substructure in the milled powers. If more than one powder component is added into the vial, the components will be intimately mixed at an atomic level. As in mechanical alloying, this re-welding and re-fracturing continues until the elemental powders making up the initial charge are blended on the atomic level, such that either a solid solution and/or phase change results. The chemistry of the resulting alloy is comparable to the percentages of the initial elemental powders. With continued milling time, grain size reduction occurs, which eventually saturates at a minimum value that has been shown to scale inversely with melting temperature of the resultant compound. Of course, the process cycle can be interrupted to obtain intermediate grain size refinement of the powder blend and intermixing of its constituents.

The diameter, density, mass, number and/or ratio of the milling media may be altered to maintain the ball to powder mass (weight) ratio sufficiently high so as influence the rate of breakdown, physical microstructure, and morphology of the resultant powder produced. For instance, the ball-to-powder mass ratio may be 4:1, 10:1 or more. To avoid cold welding and sticking to the vial and milling media, the milling process could be carried out using an additive, such as a surfactant. The additive or a surfactant may or may not be a liquid at room temperature.

The milling process may be performed at ambient or room temperature. Alternatively, the metallic powders can be continuously or semi-continuously cooled during the milling process. For instance, the milling process may be carried out using a liquid cryogen or low temperature fluid, such as liquid nitrogen. The formation of solid solutions between the constituents could be thought of as a competition between the external force of impinging balls creating finer and finer levels of intermixed alloy material via consolidation, shearing, and plastic deformation and competing processes such as diffusion-driven events such as phase separation. Thus, if mechanical milling could be performed at low enough temperatures, interdiffusion events, which are thermally activated, could all together be suppressed. As such, the likelihood of producing a solid solution is greatly enhanced. Given that the effect of the competing process is nullified, the result will be not only a much greater refinement of the grain size but also a much larger increase in the concentration of the solute in the solvent, i.e., though, non-equilibrium, the solubility limit will be higher.

In some embodiments, the elemental components are brought to a sufficiently high temperature as to create a solid solution which is then quenched rapidly to produce a supersaturated solid solution of the individual constituents. For instance, the material could be manufactured in powder form by spray atomization techniques where in the elemental components are brought to a sufficiently high temperature as to create a solid solution. Additionally, the elemental components might be brought to a sufficiently high temperature as to create a solid solution which is then quenched rapidly to produce a supersaturated solid solution of the individual constituents.

Advanced aberration corrected STEM and 3D Atom Probe Tomography has been utilized to confirm the chemistry, core, shape, morphology and/or coherency of the new NSS clusters 30 and its relationship with the surrounding matrix phase 20. FIGS. 3A through 6D, with reference to FIGS. 1 through 2, are images showing nanocrystalline Cu—Ta alloys with and without lithium. The Cu—Ta alloys without lithium have a spherical morphology and the ones with lithium (0.5 at %) have a cuboidal morphology. In addition, the strength of the alloys and the retention of the microstructure have been documented as a function of temperature.

Figure 4B:
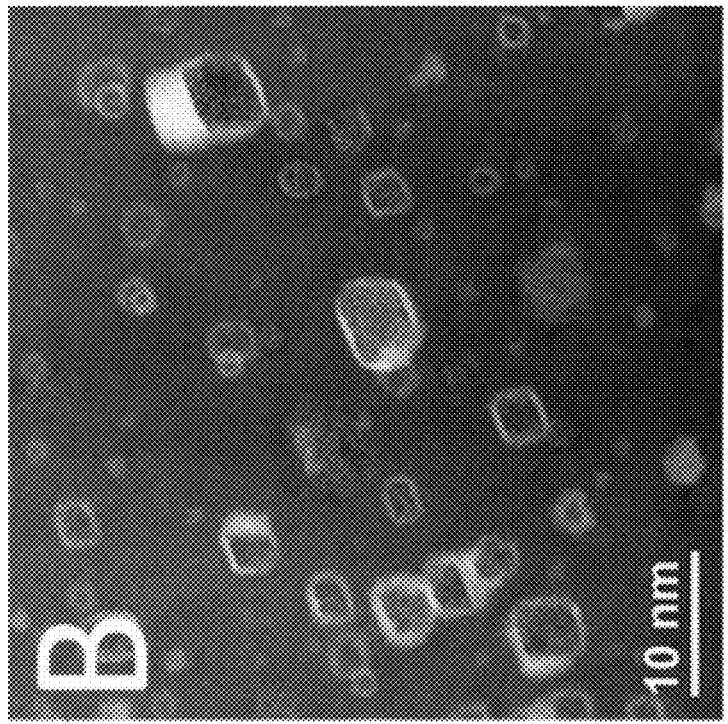
FIG. 4B is a magnified microscopic image of Ta based NSS clusters in a nanocrystalline Cu—Ta alloy with 0.5 at % Li addition, according to an embodiment herein.
Figure 4A:
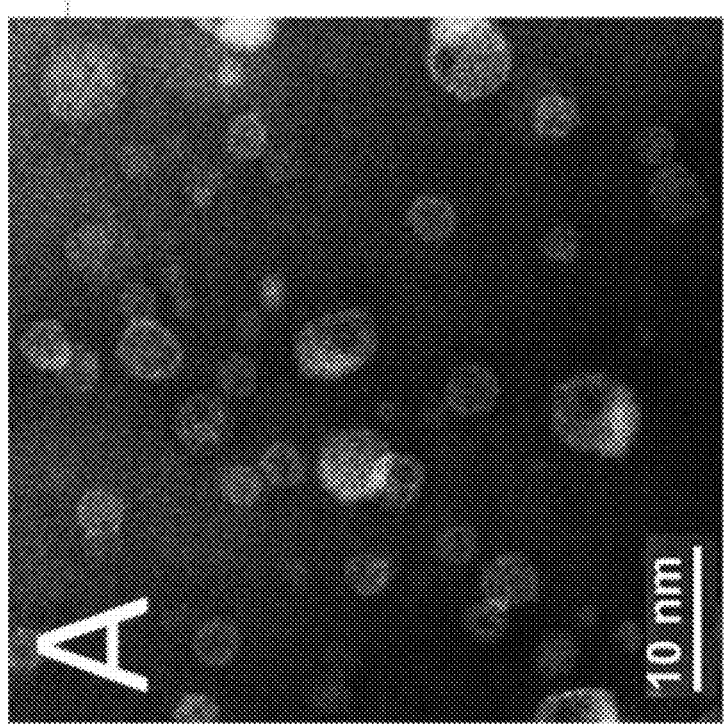
FIG. 4A is a magnified microscopic image of Ta based NSS clusters in a nanocrystalline Cu—Ta alloy without Li addition, according to an embodiment herein.

FIG. 4A is a magnified microscopic image of Ta based NSS clusters in a nanocrystalline Cu—Ta alloy without Li addition. FIG. 4B is a magnified microscopic image of Ta based NSS clusters in a nanocrystalline Cu—Ta alloy with 0.5 at % Li addition. FIG. 5A is a magnified microscopic image of binary CuTa showing the atomic structure of a spherical Ta based cluster. FIG. 5B is a magnified microscopic image of binary CuTa showing the atomic structure of a CuTaLi cuboidal cluster. FIG. 5C is a diffraction information image of FIG. 5A. FIG. 5D is a diffraction information image of FIG. 5B.

Additionally, the altered composition, i.e., addition of Li/alkali metals 25 to Cu—Ta (i.e., nanoparticle 15 and matrix phase 20) allows for the transformation of the coherent spherical Ta based NSS with an oxygen core to a cuboidal NSS 30 wherein Li solute occupies the core structure and where Ta exists in mono, bi, or greater atomic layers between the core structure and the surrounding Cu matrix phase 20. These cuboidal NSS clusters 30 occupy intergranular regions as well. The overall effect of transforming from spherical to cuboidal increases the level of coherency with the matrix phase 20 as well as the stability of the NSS cluster 30 as a whole. In turn, this new dispersion of NSS clusters 30 significantly increases the thermal and thermomechanical stability of the microstructure and physical properties of the nanocrystalline Cu—Ta alloy.

The following Tables provides hardness data for the nano-structured alloy material 10.

| Hardness Data Increasing Li in Cu3Ta | | | | | | | | |
|---|---|---|---|---|---|---|---|---|
| Annealing | Cu3Ta0.5Li | | Cu3TaLi | | Cu3Ta1.5Li | | Cu3Ta2Li | |
| Temperature °C. (for 1 h) | Hardness Vickers | Std. dev. Vickers | Hardness Vickers | Std. dev. Vickers | Hardness Vickers | Std. dev. Vickers | Hardness Vickers | Std. dev. Vickers |
| 25 | 304.0 | 11.6 | 273.5 | 9.3 | 262.7 | 10.2 | 260.6 | 12.9 |
| 400 | 333.8 | 8.2 | 287.5 | 8.4 | 287.9 | 7.6 | 270.5 | 11.0 |
| 600 | 338.1 | 8.8 | 307.6 | 11.0 | 305.1 | 7.7 | 277.4 | 13.0 |
| 800 | 331.4 | 15.9 | 296.9 | 4.5 | 300.1 | 12.7 | 262.7 | 25.8 |
| 900 | 321.4 | 14.5 | 281.6 | 6.9 | 290.6 | 4.1 | 278.5 | 15.0 |
| 1000 | 295.4 | 4.4 | | | | | | |
| 1050 | 252.7 | 14.3 | | | | | | |

| Hardness Data Increasing Ta with 0.5Li | | | | |
|---|---|---|---|---|
| | Cu—5Ta—0.5Li | | Cu10Ta0.5Li | |
| Annealing Temperature °C. (for 1 h) | Hardness Vickers | Std. dev. Vickers | Hardness Vickers | Std. dev. Vickers |
| 25 | 328.2 | 14.5 | 359 | 9.1 |
| 200 | 322.0 | 15.4 | 383.3 | 11.6 |
| 400 | 326.6 | 13.2 | 383.4 | 5.1 |
| 600 | 354.7 | 24.5 | 363.4 | 5.3 |
| 800 | 329.0 | 24.3 | 343.5 | 8.4 |
| 900 | 304.6 | 14.0 | 310.6 | 8.3 |
| 1000 | 255.0 | 7.2 | 269.7 | 5 |
| 1050 | 223.9 | 5.6 | | |

Figure 6A:
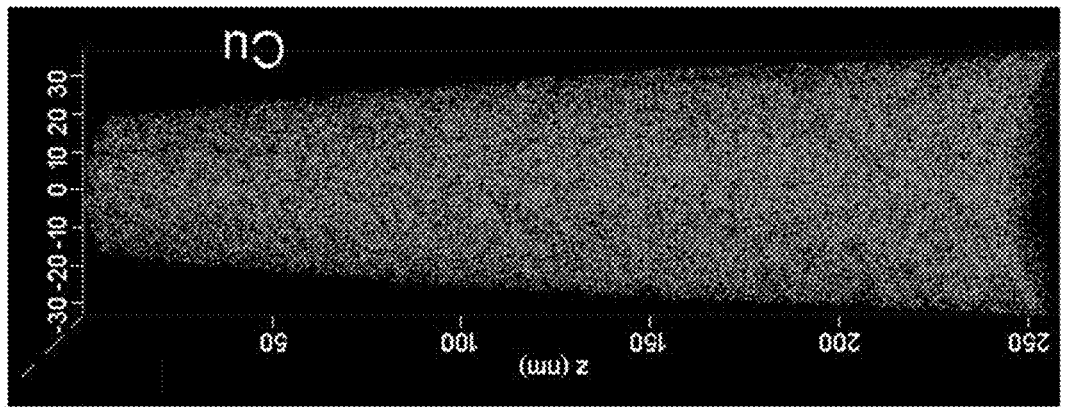
FIG. 6A is an atom map showing the distribution of Cu isoconcentration surface displayed within the CuTaLi alloy, according to an embodiment herein.
Figure 6B:
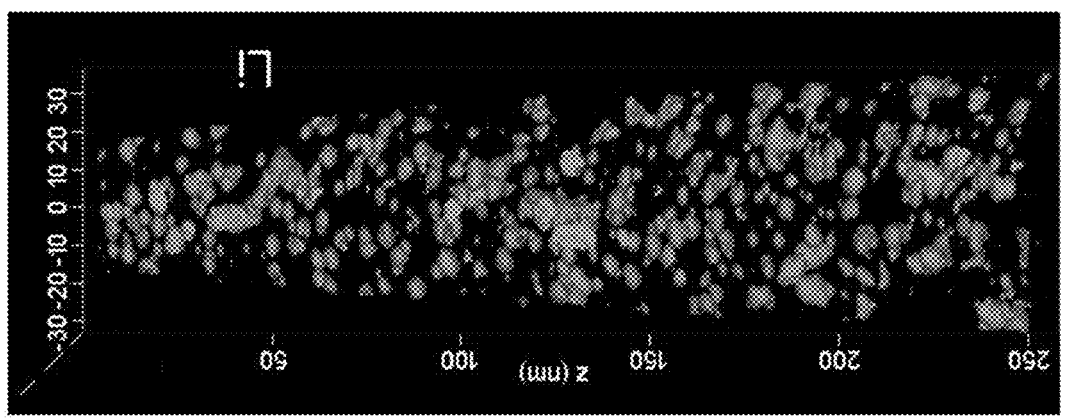
FIG. 6B is an atom map showing the distribution of Li isoconcentration surface displayed within the CuTaLi alloy, according to an embodiment herein.
Figure 6C:
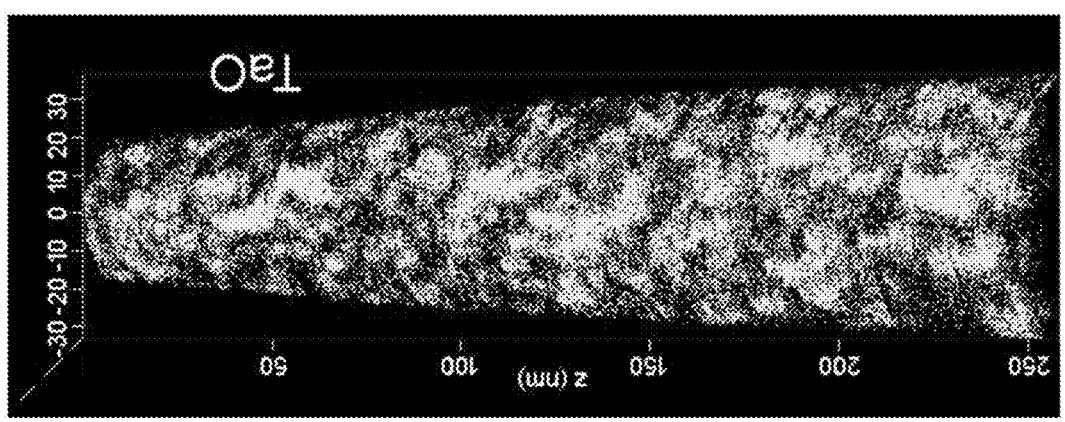
FIG. 6C is an atom map showing the distribution of TaO and $TaO_2$ isoconcentration surface displayed within the CuTaLi alloy, according to an embodiment herein.
Figure 6D:
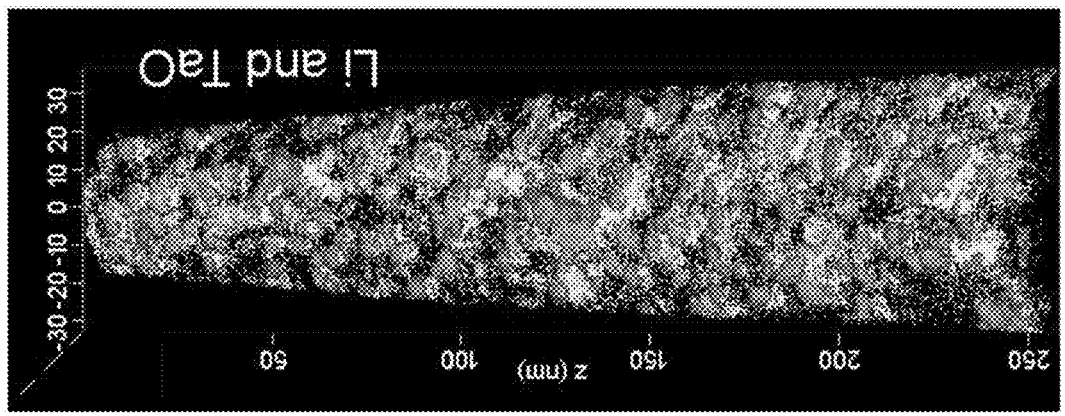
FIG. 6D is an atom map showing the distribution of TaO with 1.5 at % Li isoconcentration surface displayed within the CuTaLi alloy, according to an embodiment herein.

FIG. 6A is an atom map showing the distribution of Cu isoconcentration surface displayed within the CuTaLi alloy. FIG. 6B is an atom map showing the distribution of Li isoconcentration surface displayed within the CuTaLi alloy. FIG. 6C is an atom map showing the distribution of TaO and TaO$_2$ isoconcentration surface displayed within the CuTaLi alloy. FIG. 6D is an atom map showing the distribution of TaO with 1.5 at % Li isoconcentration surface displayed within the CuTaLi alloy, according to an embodiment herein. The images of FIGS. 6A through 6D clearly show Li concentrated within the corner of the TaO clusters. Thus, the presence of the Li is the reason for the clusters becoming faceted as seen in FIGS. 3A through 4B versus the spherical shape of the Ta based cluster in the binary CuTa alloy. The faceting of the cluster further improves the strength at, not only room temperature, but also at elevated temperatures.

The NSS clusters 30 with Li core structures provides increased thermal and mechanical stability of the Cu nanocrystalline microstructure. This increases the application space to much higher and more extreme conditions making this particular alloy material 10 with lithium more suitable for advanced applications such as those in the space, energy, and commercial sectors. This particular alloy material 10 can maintain its nanostructure and inherent strength (~1 GPa) after long term exposure, i.e., time greater than 100 hours at temperature in excess of 90% of its absolute melting temperature (1356 K). This particular addition of lithium may drastically improve the base alloy's high temperature properties. An analogy would be the development of Ni based single crystal super alloys for high temperature applications followed by the discovery and engineering of the gamma-gamma prime precipitates at a later date which drastically improved their properties further. This alloy material 10 shows an improvement in both thermal and mechanical stability. This improvement is based on engineering a more complex and sophisticated NSS cluster 30. This, in turn, makes possible more extreme applications. This also provides a method for engineering all alloys which depend on nanoscale oxide particles for their respective properties, such as ODS alloys, which are suggested to be the next generation alloys utilized in conjunction for nuclear power generation.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A nano-structured alloy material comprising:
   a Cu based matrix phase;
   a dispersion of nanoparticles within the Cu based matrix phase comprising:
   a core comprising an alkali/alkali Earth metal or a hydride thereof; and
   one or more atomic layers comprising a Group III, IV, V, VI element, Fe, Co, or any combination thereof between the core and surrounding matrix phase.

2. The nano-structured alloy material of claim 1, wherein the alkali/alkali Earth metal or a hydride thereof comprises a concentration of less than 5 at % of the total composition.

3. The nano-structured alloy material of claim 1, wherein the core of the nanoparticles and/or the Cu based matrix phase comprise Li or Li-hydride.

4. The nano-structured alloy material of claim 1, wherein the Cu based matrix phase comprises: Cu based metal and up to about 25 at % of a Group III, IV, V, VI element, Fe or Co.

5. The nano-structured alloy material of claim 1, wherein the Cu based matrix phase further comprises: a Group I and Group II element or hydride thereof.

6. The nano-structured alloy material of claim 1, wherein the Cu based matrix phase comprises a binary, ternary, or multicomponent composition in the form of a solid solution.

7. The nano-structured alloy material of claim 1, wherein the Cu based matrix phase comprises a grain size of an average diameter greater than 1 nm and less than 10 microns.

8. The nano-structured alloy material of claim 1, wherein the one or more atomic layers of the nanoparticles comprise: Ta.

9. The nano-structured alloy material of claim 1, wherein the number of atomic layers does not exceed five.

10. The nano-structured alloy material of claim 1, wherein the nanoparticles have average diameters of less than 10 nm.

11. The nano-structured alloy material of claim 1, wherein within a grains of the matrix phase, an altered material property of the nanoparticle by the alkali/alkali Earth metal creates a nano-structured superlattice (NSS) clusters and alloy material comprising an order $L_{12}$ $Cu_3Li$ phase.

12. The nano-structured alloy material of claim 11, wherein the nanoparticle comprises a polyhedral morphology.

13. The nano-structured alloy material of claim 11, wherein the NSS clusters and alloy material comprises particles with diameters of less than 10 nm.

14. The nano-structured alloy material of claim 11, wherein the NSS clusters and alloy material comprises a particle number density greater than $10^{15}/m^3$.

* * * * *